(12) United States Patent
Peirone et al.

(10) Patent No.: US 11,148,532 B2
(45) Date of Patent: Oct. 19, 2021

(54) LUGGAGE COMPARTMENT OF AN ELECTRIC TRACTION VEHICLE

(71) Applicant: FCA ITALY S.p.A., Turin (IT)

(72) Inventors: Federico Peirone, Turin (IT); Daniele Ghislieri, Turin (IT)

(73) Assignee: FCA ITALY S.p.A., Turin (IT)

( * ) Notice: Subject to any disclaimer, the term of this patent is extended or adjusted under 35 U.S.C. 154(b) by 35 days.

(21) Appl. No.: 15/930,060

(22) Filed: May 12, 2020

(65) Prior Publication Data

US 2020/0361317 A1  Nov. 19, 2020

(30) Foreign Application Priority Data

May 13, 2019  (EP) ..................................... 19174232

(51) Int. Cl.
*B60K 1/04* (2019.01)
*B60L 3/00* (2019.01)

(52) U.S. Cl.
CPC .............. *B60L 3/0007* (2013.01); *B60K 1/04* (2013.01); *B60K 2001/0411* (2013.01); *B60Y 2306/01* (2013.01)

(58) Field of Classification Search
CPC .................................. B60K 3/007; B60K 1/04
See application file for complete search history.

(56) References Cited

U.S. PATENT DOCUMENTS

| | | | | |
|---|---|---|---|---|
| 7,717,207 B2* | 5/2010 | Watanabe | ............... | B60L 50/66 180/68.5 |
| 8,051,934 B2* | 11/2011 | Kiya | ....................... | B60L 50/66 180/68.5 |
| 8,616,319 B2* | 12/2013 | Yokoyama | ............... | B60K 1/04 180/68.5 |
| 8,708,401 B2* | 4/2014 | Lee | ....................... | B62D 25/082 296/187.03 |
| 9,981,541 B2* | 5/2018 | Onodera | .................. | B60L 50/60 |
| 2004/0090085 A1* | 5/2004 | Kawasaki | ............... | B60L 50/71 296/187.09 |
| 2008/0283316 A1* | 11/2008 | Ono | ...................... | B60K 15/063 180/68.5 |

(Continued)

FOREIGN PATENT DOCUMENTS

DE    102016111230 A1    12/2017

OTHER PUBLICATIONS

European Search Report in corresponding European Patent Application No. 19174232.9 dated Nov. 13, 2019.

*Primary Examiner* — James A Shriver, II
*Assistant Examiner* — James J Triggs
(74) *Attorney, Agent, or Firm* — Harness, Dickey & Pierce, P.L.C.

(57) ABSTRACT

A luggage compartment of an electric traction vehicle has a floor, an electric/electronic unit for recharging a battery pack, and a support structure provided with a frame that supports such electric/electronic unit in a fixed position; the support structure has an attachment portion which is arranged in front of the frame, is fixed to the floor and is joined to the frame by means of a deformable portion, adapted to bend about an axis which is horizontal and transverse to a travel direction of the vehicle; the floor is provided with a pushing element having a support surface, on which a lower surface of the frame rests at a point which is higher than the bending axis of the deformable portion.

12 Claims, 4 Drawing Sheets

(56) References Cited

U.S. PATENT DOCUMENTS

2009/0026802 A1\* 1/2009 Imada .................. B62D 21/152
  296/187.11
2014/0048070 A1\* 2/2014 Wedler .............. A61M 16/0858
  128/204.23

\* cited by examiner

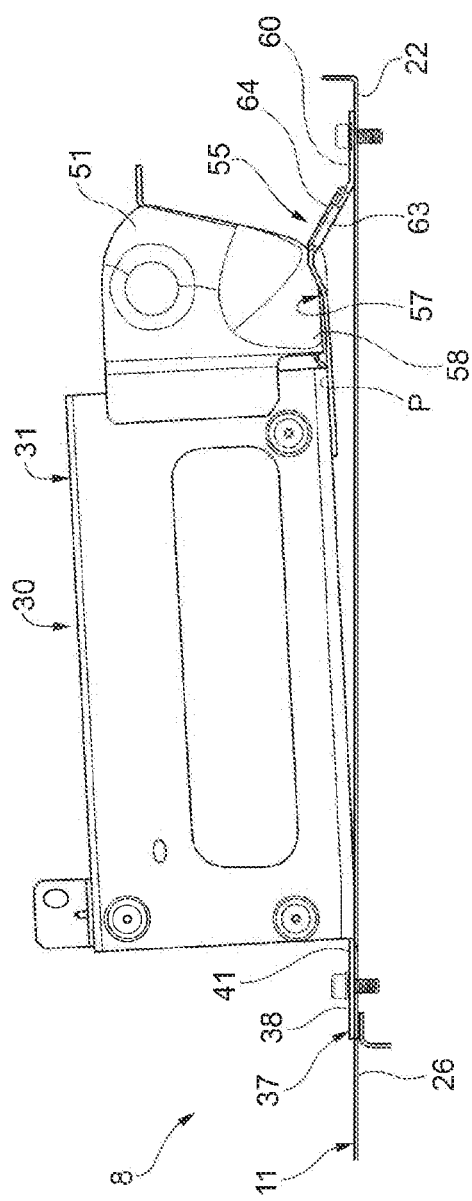

LUGGAGE COMPARTMENT OF AN ELECTRIC TRACTION VEHICLE

CROSS-REFERENCE TO RELATED APPLICATION

This patent application claims priority from European patent application no. 19174232.9 filed on May 13, 2019, the entire disclosure of which is incorporated herein by reference.

TECHNICAL FIELD

The present invention relates to a luggage compartment of an electric traction vehicle. Here and in the following, "electric traction vehicle" means both a purely electric vehicle (in which the driving wheels are driven exclusively by one or more traction electric motors), and a hybrid drive vehicle provided with a heat engine and at least one electric motor for traction.

BACKGROUND OF THE INVENTION

As is known, electric traction vehicles comprise a high-voltage battery pack (typically 400 V), capable of supplying electric power to the electric traction motor by means of an inverter, and an electric/electronic unit connected by means of high-voltage wiring to such battery pack, to recharge the same (during the electrical braking operations of the vehicle and/or by means of a socket that can be connected to an external electric power source). The charger of such electric/electronic unit is also provided with a transformer to vary the voltage of the current with which the battery pack is recharged.

In the solutions in which the electric/electronic unit is arranged in the rear luggage compartment of the vehicle, it is necessary to take some precautions to ensure safety in the event of a rear impact at a relatively high speed. In particular, such precautions must avoid the risk of the electric/electronic unit entering the passenger compartment and injuring those occupying the rear seats, and avoiding the risk of high-voltage wiring being severed and coming into contact with the metal body parts of the vehicle, with consequent injuries due to electric shock to occupants and rescuers.

SUMMARY OF THE INVENTION

An object of the present invention is to provide a luggage compartment of an electric traction vehicle, which allows this need to be met relatively easily and inexpensively.

According to the present invention, a luggage compartment of an electric traction vehicle is provided, as defined in claim 1.

BRIEF DESCRIPTION OF THE DRAWINGS

For a better understanding of the present invention, a preferred embodiment is now described, purely by way of non-limiting example, with reference to the attached drawings, in which:

FIG. 2 illustrates, in a side view and with parts removed for clarity, a component of the luggage compartment of FIG. 1;

FIG. 3 is similar to FIG. 2 and illustrates, in simplified form, the movement of the component of FIG. 2 in the event of a rear impact against the vehicle;

DETAILED DESCRIPTION OF THE INVENTION

Figure 1:
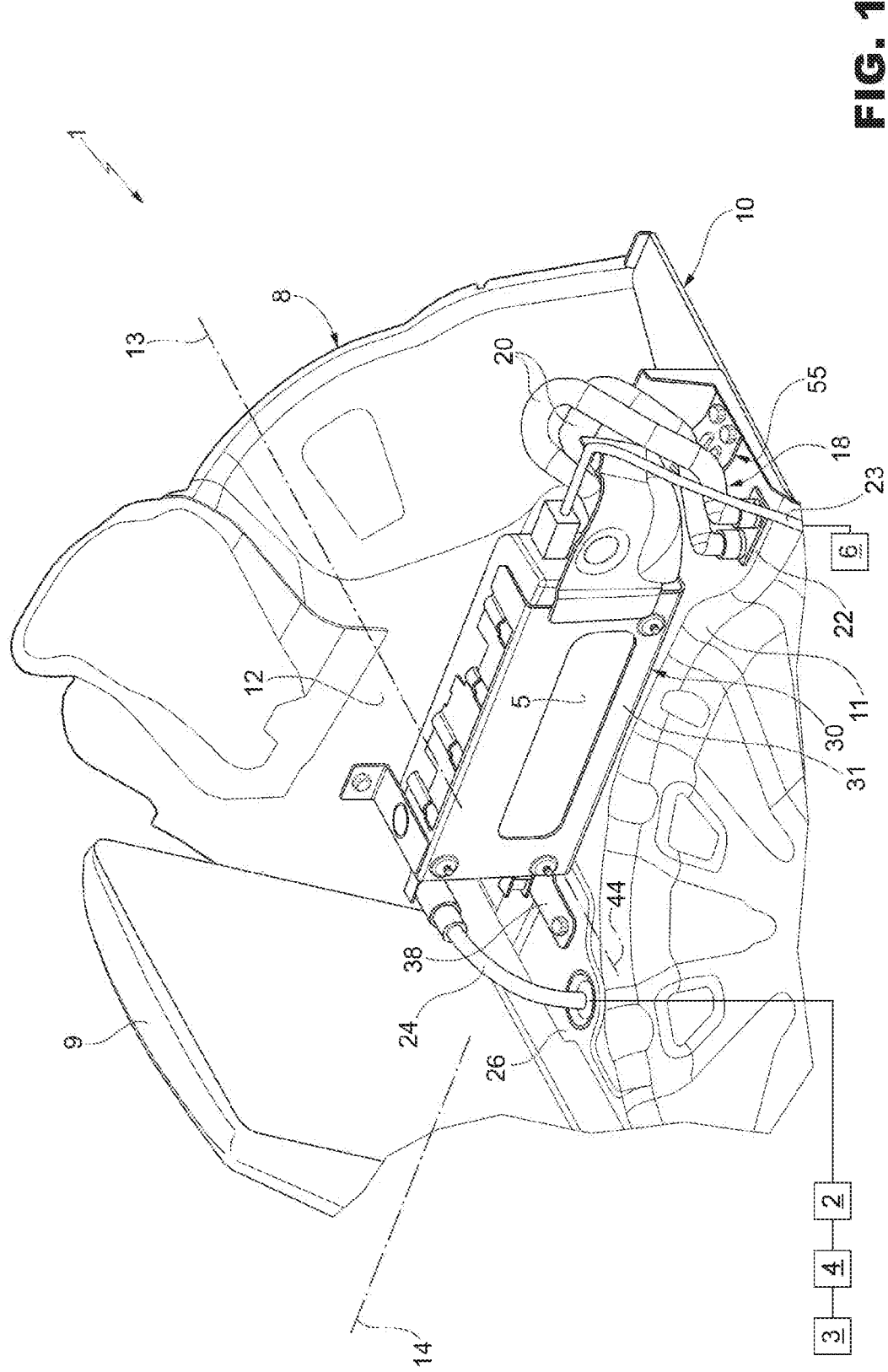
FIG. 1 is a partial perspective view, with schematized parts, of a preferred embodiment of the luggage compartment of an electric traction vehicle according to the present invention.

In FIG. 1, the reference number 1 denotes, as a whole, an electric traction vehicle (illustrated in a partial and simplified manner). The vehicle 1 can be a purely electric traction vehicle or a hybrid drive vehicle, provided with at least one electric motor and a heat engine.

The vehicle 1 comprises: a battery pack 2 (schematically illustrated), in particular of the so-called "high-voltage" type (for example 400 V), which stores and supplies electrical energy in direct current; at least one traction electric motor (schematically illustrated) coupled directly or indirectly to one or more wheels of the vehicle 1 for the traction of such wheels; and an inverter 4 (schematically illustrated) interposed between the battery pack 2 and the motor 3 to convert the electric current from continuous to alternating current and supply the motor 3 itself. In particular, the motor 3 is defined by a rotating electric machine which also acts as an alternator, for converting mechanical energy into electrical energy during at least some of the braking operations performed by the driver during the travel of the vehicle 1.

The vehicle 1 further comprises an electric/electronic unit 5 for recharging the battery pack 2. The electric/electronic unit 5 comprises a transformer for converting the alternating current into direct current, and/or for varying the voltage of the direct current during recharging operations carried out by means of a socket or connector 6 (schematically illustrated), which can be connected to an external electric power source, provided in suitable recharging stations.

The electric/electronic unit 5 is arranged in a luggage compartment 8, provided in particular at the rear end of the vehicle 1, i.e. behind the backrest of a rear seat 9 (partially shown). The luggage compartment 8 comprises a metal structure 10 forming part of the body of the vehicle 1 and having a substantially horizontal floor or support surface 11, and two side panels 12, only one of which is shown in the attached Figures. The side panels 12 face each other along a horizontal direction 13 which is orthogonal to a longitudinal direction 14 corresponding to the horizontal travel direction of the vehicle 1. In particular, the side panels 12 are shaped so as to define respective wheel housings around the rear wheels of the vehicle 1. In the specific illustrated example, the electric/electronic unit 5 is arranged in a side position adjacent to one of the side panels 12.

As shown in FIG. 1, the electric/electronic unit 5 is cooled while the vehicle 1 is running by means of a cooling system 18, of a known type and not described in detail, configured so as to maintain the temperature below a given threshold (for example 70° C.). In particular, the system 18 comprises a return duct and a supply duct, denoted by the reference number 20, for transferring a cooling fluid from and towards the electric/electronic unit 5. In particular, the ducts 20 extend starting from a rear end 21 of the electric/electronic unit 5 to a rear end 22 of the floor 11.

The electric/electronic unit 5 is connected by means of wiring 23 to the socket 6 and by means of wiring 24 to the battery pack 2. The wiring 23 extends starting from the rear end 21 and, obviously, is crossed by electric current only when the vehicle 1 is not running (for example, it is stopped at the recharging station). The wiring 24, instead, extends from a front end of the electric/electronic unit 5 up to a front portion 26 of the floor 11, near the rear seat 9, and are subjected to high-voltage in each operating condition.

Figure 4:
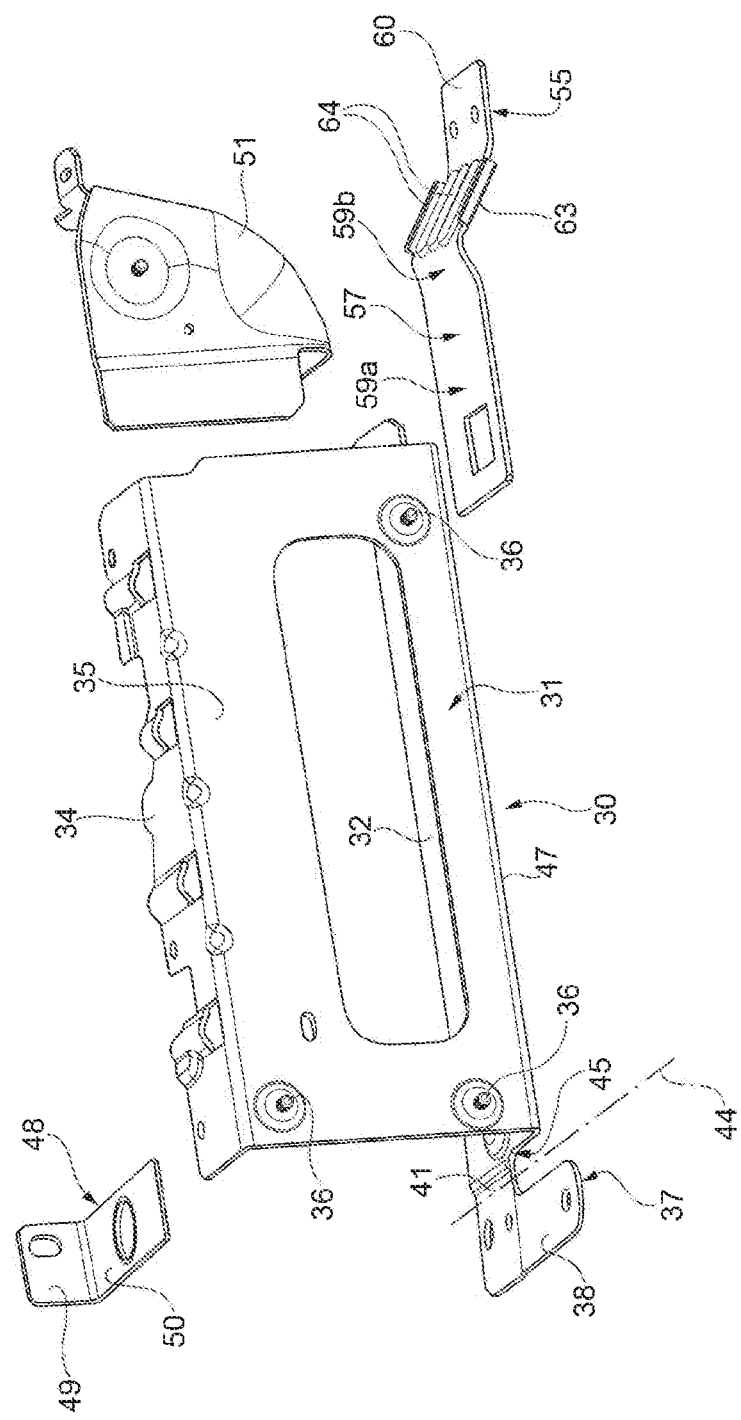
FIG. 4 is an exploded view of some parts of the component of FIG. 2.

The luggage compartment 8 further comprises a structure 30, which supports the electric/electronic unit 5 in a fixed position and, in turn, is fixed to the floor 11. In particular, the structure 30 comprises a frame 31 defining a housing engaged by the electric/electronic unit 5. With reference to FIG. 4, the frame 31 comprises a base wall 32 and an upper wall 34 which are arranged under and above the electric/electronic unit 5, respectively, and are connected to one another by means of a side wall 35, substantially vertical and preferably provided with fixing elements 36 (for connecting, for example, a covering, not shown).

The structure 30 further comprises an attachment bracket 37 which protrudes forward and in one piece with respect to a front end of the frame 31. The attachment bracket 37 comprises: a flap 38 resting on the portion 26 of the floor 11, in a position spaced apart from the wiring 24, and fixed to the floor 11, for example by means of screws (FIG. 1); and a deformable portion 41, which joins the flap 38 to the wall 32 and has a weakening and/or cross-section variation such as to define a virtual hinge, i.e. such as to give the possibility of bending about an axis 44 parallel to the direction 13. In other words, the deformable portion 41 has a shape and/or size and/or material such as to bend more easily than the wing 38, to allow the frame 31 to rotate about the axis 44 (as shown in FIG. 3).

As can be seen in FIG. 4, the deformable portion 41 has a groove, a recess or a slot, which is denoted by the reference number 45 and extends parallel to the axis 44, specifically starting from a corner 47 which joins the walls 32 and 35 together.

The structure 30 further comprises a retaining bracket 48, which preferably is a component distinct from the frame 31, is fixed to the side panel 12, for example by means of screws, and is coupled to the frame 31 so as to hold it downwards, i.e. towards the floor 11, under normal running conditions. The retaining bracket 48 is L-shaped, i.e. it comprises two flaps 49 and 50, which are transverse one to the other and are coupled to the side panel 12 and to the wall 34, respectively. In particular, the flap 50 is fixed to the wall 34 by means of welding. Other types of fixing may be provided as an alternative to welding.

The structure 30 further comprises a half-shell 51, which is coupled to a rear end of the frame 31, for example by spot welding, and is protectively arranged around a part of the ducts 20.

With reference to what is shown in simplified form in FIG. 2, the luggage compartment 8 further comprises a pushing element 55, which is overlapping and fixed to the end 22 of the floor 11, and comprises a support surface 57, on which a rear end 58 of the structure 30 rests, preferably without further constraints between the end 58 and the pushing element 55.

According to a preferred aspect of the present invention, as shown in FIG. 3, the support surface 57 is inclined with respect to a horizontal plane, and downwardly running forwards along the axis 14, so as to define a wedge to push the end 58 upwards in the event of deformation of the floor 11 and advancement of the pushing element 55 with respect to the portion 26 towards the axis 44 during a possible rear impact against the vehicle 1.

In fact, in the event of a rear impact at a relatively high speed, the structure 10 tends to deform, with a shortening of the length of the floor 11. Following such shortening, the rear end 22 with the pushing element 55 approaches the portion 26 with the flap 38, therefore the support surface 57 slides along the lower surface of the frame 31 thus pushing the latter upwards. The stiffness and/or the fastenings of the retaining bracket 48 and the stiffness of the deformable portion 41 are not sufficient to overcome this thrust and to keep the frame 31 downwards. Therefore, the bracket 48 bends and/or breaks and/or detaches, to decouple the frame 31 from the side panel 12, while the deformable portion 41 bends about the axis 44, so that the frame 31 (with the half-shell 51) rises, thus rotating about such axis 44.

More generally, according to alternatives not illustrated, the support surface 57 may not be inclined: by way of example, it is sufficient to rest the support surface 57 on the lower surface of the structure 31 in an area or in a point P (FIG. 2) which is higher than the position of the axis 4, in order to equally obtain the wedge effect and cause the lifting thrust on the frame 31 during the deformation of the floor 11.

As indicated above, the pushing element 55 is a component distinct from, and fixed to, the floor 11; according to variations not illustrated, the pushing element 55 is defined by a raised portion of the floor 11.

With reference to FIGS. 2 and 4, preferably the pushing element 55 comprises at least one plate element, folded so as to form a plurality of walls joined to one another. In particular, the pushing element 55 ends at the rear with an attachment wall 60 fixed to the rear end 22 of the floor 11, for example by means of screws. Advantageously, the support surface 57 is joined to the attachment wall 60 by means of an intermediate wall 63 which is inclined in the opposite direction to the support surface 57 and preferably bears a plurality of stiffening projections 64, to limit the deformation of the pushing element 55 along the axis 14, during the advancement and the consequent upwards thrust on the frame 31.

In particular, the support surface 57 comprises two inclined areas 59a and 59b arranged in succession and having different inclinations. Under normal running conditions (i.e. in the absence of impacts and/or deformations), the frame 31 and the half-shell 51 rest on the areas 59a and 59b, respectively. The inclinations of the areas 59a and 59b are substantially equal to that of the lower surface of the frame 31 and to that of the lower surface of the half-shell 51, respectively. In other words, the shape of the areas 59a and 59b is approximately complementary (i.e. the negative) with respect to such lower surfaces.

Figure 5:
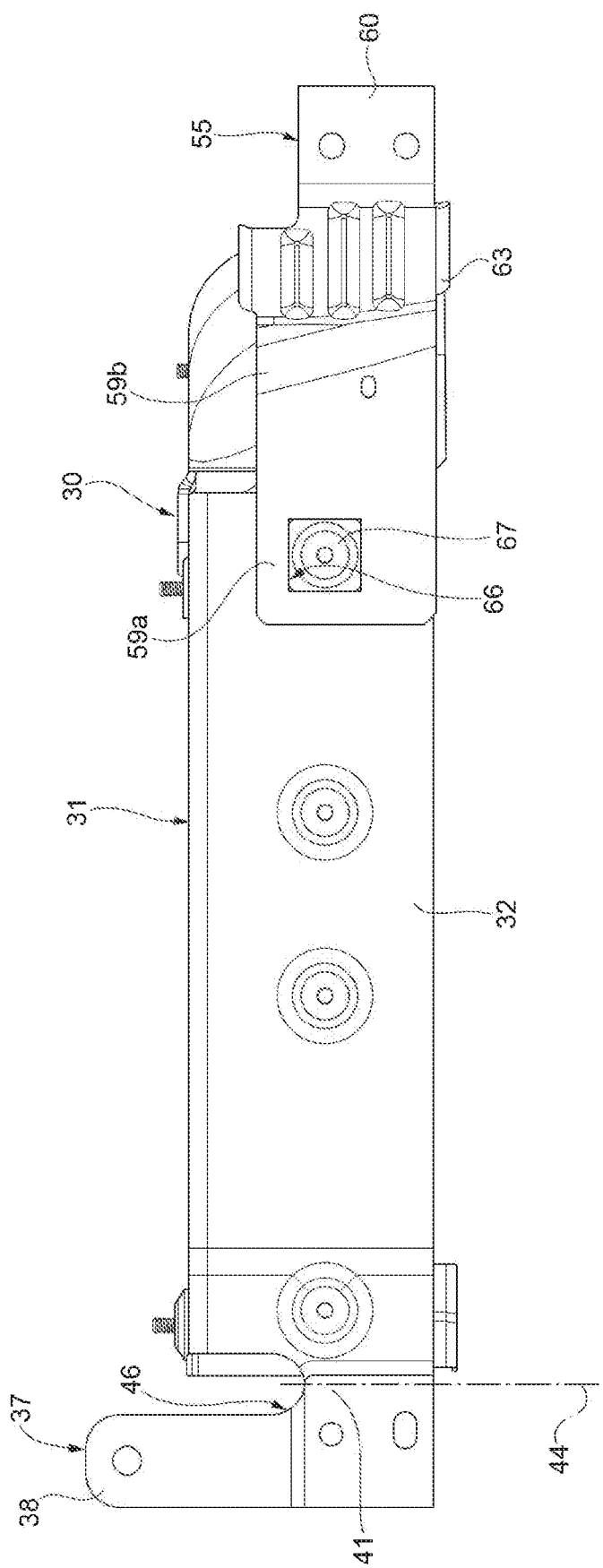
FIG. 5 is a view from below of the component of FIG. 2.

As can be seen in FIG. 5, the area 59a preferably has an opening 66 which is engaged by a lower projection 67 of the wall 32, for a positioning and/or centring function during the assembly operations of the electric/electronic unit 5 housed in the structure 30.

As explained above with reference to FIG. 3, in the event of a rear impact, the advancement of the pushing element 55 causes the deformable portion 41 to bend and the frame 31 to rotate upwards. Thanks to such rotation, the electric/electronic unit 5 is not directly affected by the rear impact and by the deformations of the body during the impact. In the final position (illustrated schematically and in dotted line in FIG. 3), the electric/electronic unit 5 remains equally constrained to the floor 11 by means of the attachment bracket 37. Due to this constraint, the electric/electronic unit 5 is not projected by inertia against the seat 9 and its front end remains close to the floor 11, so that the wiring 24 remains intact, i.e. is not severed. Therefore, the risk of putting the metal parts of the vehicle 1 under tension is avoided.

From what has just been described it is clear that the electric/electronic unit 5 does not constitute any danger for passengers, in the event of a rear impact, even at relatively high speeds. In fact, the pushing element 55, in combination with the deformable portion 41, forms a safety element which keeps the electric/electronic unit 5 constrained to the floor 11 in the luggage compartment 8 in a relatively safe position, which moreover can be envisaged during designing phase (by way of appropriate simulations).

In addition, the pushing element 5, besides being effective and being a relatively simple element to produce and to assemble, on any type of vehicle, does not generate particular obstructions and does not require particular modifications to the structures of vehicles already in production.

Finally, it is clear that modifications and variations may be made to the luggage compartment 8 described with reference to the accompanying figures, without thereby departing from the scope of the present invention, as defined in the attached claims.

In particular, the details of shape and structure of the pushing element 55 and of the deformable portion 41 could be different from what is shown by way of example.

Moreover, the retaining bracket 48 could be absent, or have a different shape and/or size and/or be coupled to the frame 31 and/or to the side panel 12 in a manner different from that described above: for example, the retaining bracket 48 could be coupled by means of fastening elements that are severed in the event of stress during the impact.

Furthermore, the axis 44 may not be perfectly orthogonal to the axis 14.

Finally, as mentioned above, the present invention also applies to hybrid electric traction vehicles with a heat engine, preferably of the plug-in type.

The invention claimed is:

1. A luggage compartment of an electric traction vehicle, the luggage compartment comprising:
   a floor;
   an electric/electronic unit for recharging a battery pack;
   a support structure comprising:
   a) a frame which carries said electric/electronic unit in a fixed position;
   b) an attachment portion arranged in front of said frame and fixed to said floor;
   c) a deformable portion interposed between said attachment portion and said frame and adapted to bend about an axis which is horizontal and is transverse to a horizontal advancement direction of the vehicle;
   a pushing element fixed with respect to said floor and comprising a support surface;
   said support structure having a lower surface which rests on said support surface so as to be pushed upwards when said pushing element moves towards said axis in the event of an accident.

2. The luggage compartment according to claim 1, wherein said lower surface rests on said support surface at a point which is higher than said axis.

3. The luggage compartment according to claim 1, wherein said support surface is inclined with respect to a horizontal plane, and downwardly running forwards along said horizontal advancement direction.

4. The luggage compartment according to claim 1, wherein said pushing element is distinct from said floor and fixed to said floor.

5. The luggage compartment according to claim 1, wherein said pushing element comprises a plate element.

6. The luggage compartment according to claim 5, wherein said pushing element comprises an intermediate wall, which is joined to said support surface and is inclined upwardly running forwards along said horizontal advancement direction.

7. The luggage compartment according to claim 6, wherein said intermediate wall bears a plurality of stiffening projections.

8. The luggage compartment according to claim 3, wherein said support surface comprises two areas having inclinations different to one another.

9. The luggage compartment according to claim 3, wherein the inclination of said support surface is substantially equal to an inclination of said lower surface.

10. The luggage compartment according to claim 1, wherein said support surface has an opening which is engaged by a lower projection of said frame.

11. The luggage compartment according to claim 1, wherein said deformable portion has a groove, a recess or a slot which extends parallel to said axis.

12. The luggage compartment according to claim 1, wherein the luggage compartment comprises two side panels and a retaining bracket, which is fixed to one of said side panels and is coupled to said frame so as to hold said frame downwards.

* * * * *